United States Patent
Ishizuka et al.

Patent Number: 5,666,219
Date of Patent: Sep. 9, 1997

[54] ROTARY POLYGON MIRROR TYPE LIGHT DEFLECTING SYSTEM

[75] Inventors: Yutaka Ishizuka; Koichi Katakura, both of Nagano, Japan

[73] Assignee: Kabushiki Kaisha Sankyo Seiki Seisakusho, Nagano, Japan

[21] Appl. No.: 739,672

[22] Filed: Oct. 31, 1996

Related U.S. Application Data

[63] Continuation of Ser. No. 520,737, Aug. 29, 1995, abandoned.

[30] Foreign Application Priority Data

Aug. 29, 1994 [JP] Japan ................................. 6-203872

[51] Int. Cl.$^6$ ........................................ G02B 26/08
[52] U.S. Cl. ............... 359/200; 359/198; 359/216; 384/144; 384/544; 310/90
[58] Field of Search .................. 359/198, 200, 359/216–219, 871, 872; 310/90, 90.5; 384/144, 372, 490, 543, 544, 151–153

[56] References Cited

U.S. PATENT DOCUMENTS

| | | | |
|---|---|---|---|
| 4,691,998 | 9/1987 | Sakagaito et al. | 359/216 |
| 5,001,581 | 3/1991 | Elsasser et al. | 360/97.02 |
| 5,227,686 | 7/1993 | Ogawa | 310/90 |
| 5,463,490 | 10/1995 | Seto | 359/200 |

*Primary Examiner*—James Phan
*Attorney, Agent, or Firm*—Sughrue, Mion, Zinn, Macpeak & Seas

[57] ABSTRACT

Rotary polygon mirror type light deflecting system having a labyrinth ring fixed to an end of a fixed shaft. An outer circumferential surface of a labyrinth ring is caused to confront an inner circumferential surface of a polygon mirror while interposing a small gap therebetween in a radial direction. Further, a lower portion of a circular hole of the polygon mirror is fitted with a cylindrical sleeve of a hub to fix the polygon mirror to the hub. The polygon mirror and the labyrinth ring are made of the same material, e.g., aluminum or an aluminum alloy. The small gap is made as small as possible.

8 Claims, 4 Drawing Sheets

ROTARY POLYGON MIRROR TYPE LIGHT DEFLECTING SYSTEM

This is a continuation of application Ser. No. 08/520,737 filed Aug. 29, 1995, now abandoned.

FIELD OF THE INVENTION

This invention relates to a polygon mirror driving apparatus that constitutes a rotary polygon mirror type light deflecting system. More specifically, the invention is directed to a polygon mirror driving apparatus that contributes not only to preventing contamination of the reflecting surfaces of the polygon mirror due to the scattering around of a mist of lubricating oil but also to downsizing and thin-sizing the apparatus.

BACKGROUND OF THE INVENTION

In case that a polygon mirror has been used for a long time, the reflecting surfaces thereof become contaminated by a mist of lubricating oil scattered around from the ball bearing or the like of the polygon mirror driving apparatus, and this has been the cause for impairing the laser beam reflecting rate. To overcome this problem, one has contrived to prevent the mist of lubricating oil from scattering around the reflecting surfaces of the polygon mirror.

For example, a light deflecting system disclosed in Japanese Patent Publication No. Hei. 3-71690 shown in FIG. 4 is characterized as follows. A zigzag labyrinth is formed in order to prevent the scattering around of a mist of lubricating oil from a ball bearing 22 that fixes a vertical shaft 21 while interposed between an upper case 20 and the vertical shaft 21. The zigzag labyrinth is formed not only by fixing a shaped plate 24 on the upper end of a polygon mirror 23, the shaped plate 24 having projected portions so as to be zigzag in section, but also by securing another shaped plate 25 to the inner surface of the upper case 20 so that the shaped plate 24 is fitted with the shaped plate 25, the shaped plate 25 having recessed portions so as to be zigzag in section. Namely, a gap between the shaped plates 24, 25 corresponds to the labyrinth. For the same purpose, another labyrinth is formed by arranging a spacer 26 on the outer circumference of the vertical shaft 21 as high as the upper end of the polygon mirror 23 and further arranging an annular projected portion 27, so that the labyrinth can be formed utilizing a space between the spacer 26 and the annular projected portion 27.

This arrangement entails much time in preparing the complicatedly zigzag-shaped plates 24, 25, makes the assembling operation cumbersome due to a large number of parts being involved, and hence makes the light deflecting system itself costly and reduces productivity. It is for these reasons that the light deflecting system has been considered less user-friendly.

Further, since the zigzag-shaped plates 24, 25 are interposed between the upper end of the polygon mirror 23 and the upper case 20, the length of the vertical shaft 21 of the light deflecting system in the vertical direction, i.e., the height of the light deflecting system becomes large, which in turn has made it difficult to downsize and thin-size the light deflecting system.

SUMMARY OF THE INVENTION

The present invention has been made in view of the aforementioned circumstances. The object of the invention is, therefore, to provide a polygon mirror type light deflecting system that is characterized as follows. A labyrinth ring is fixed to an end of a fixed shaft, and an outer circumferential surface of the labyrinth ring confronts an inner circumferential surface of the polygon mirror while interposing a small gap therebetween in a radial direction. Therefore, the scattering around of a mist of lubricating oil is suppressed by forming the labyrinth utilizing the small gap, and by forming the labyrinth within the space between the inner circumferential surface of the polygon mirror and the fixed shaft, not only the height of the light deflecting system can be reduced to make the system flat, but also the shape of the labyrinth is made simple, contributing to reducing the number of parts and simplifying the assembling operation.

DETAILED DESCRIPTION OF THE PREFERRED EMBODIMENTS

1st Embodiment

Figure 1:
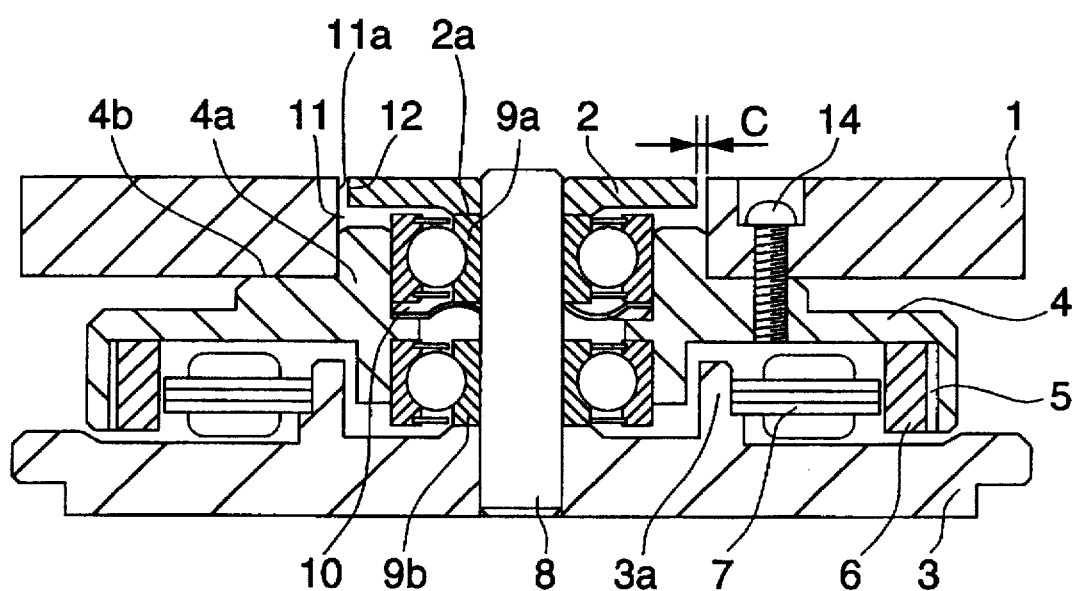
FIG. 1 is a sectional view showing a shaft-fixed rotary polygon mirror type light deflecting system, which is a first embodiment of the invention.

FIG. 1 is a sectional view showing a shaft-fixed rotary polygon mirror type light deflecting system, which is a first embodiment of the invention. Reference numeral 1 denotes a polygon mirror having a polygonal reflecting surfaces on the outer circumference thereof and having a circular hole 11 in the center thereof. The polygon mirror 1 is used as a rotary polygon mirror for laser beam printers. Reference numeral 2 denotes a disklike labyrinth ring, the central portion thereof being secured to a fixed shaft 8 by press-fit or bonding. Reference numeral 3 denotes a frame having a base end of the fixed shaft 8 embedded in the center thereof. The inner rings of ball bearings 9a, 9b are fitted with the fixed shaft 8, and the outer rings of the ball bearings 9a, 9b are fitted with the inner diameter portion of a hub 4. The hub 4 is rotatably supported with respect to the fixed shaft 8. Reference numeral 10 denotes a spring for giving reload to the ball bearing 9a.

A cylindrical sleeve 4a is arranged in the upper middle of the hub 4 so as to be integrated with the hub 4. The outer circumference of the sleeve 4a is concentric with the fixed shaft 8. The circular hole 11 of the polygon mirror 1 is positioned with a high degree of accuracy since a lower portion of the circular hole 11 is fitted with the sleeve 4a arranged in the center of the hub 4 while guided by the outer circumferential surface of the sleeve 4a, the lower portion being as viewed in the axial direction of the circular hole 11. On the other hand, in the upper portion of the circular hole 11 of the polygon mirror 1, a space is formed with respect to the fixed shaft 8. The inner circumferential surface of the circular hole 11 of the polygon mirror 1 positions the center of the sleeve 4a. Further, the lower end of the polygon mirror 1 is not only disposed on a bench portion 4b of the hub 4 but also is fixed to the hub 4 with a screw 14.

Within the space formed between the upper portion of the polygon mirror 1 and the fixed shaft 8, the labyrinth ring 2 is disposed while being firmly secured to the fixed shaft 8. The outer circumferential surface 12 of the labyrinth ring 2 confronts an inner circumferential surface 11a of the circular hole 11 of the polygon mirror 1 while interposing a small gap C of about 0.01 to 0.05 mm in the radial direction, so that a labyrinth is formed. It is preferable to cause the entire surface of the outer circumferential surface 12 of the labyrinth ring 2 to confront the inner circumferential surface 11a of the polygon mirror 1. For implementing this, the labyrinth ring 2 is fixed to the fixed shaft 8 so as to be at least as high as or lower than the upper end of the polygon mirror 1 in the axial direction. Since the labyrinth ring 2 is arranged within the space formed inside the circular hole 11 of the polygon mirror 1 as described above, the height of the light deflecting system can be reduced, which in turn allows the light deflecting system to be downsized as well as thin-sized.

As described above, the labyrinth is formed by causing the outer circumferential surface 12 of the labyrinth ring 2 to confront the inner circumferential surface 11a of the polygon mirror 1 through the small gap C. The small gap C is preferred to be set to about 0.01 to 0.05 mm. The gap C which is smaller than 0.01 mm provides satisfactory labyrinth effect but, at the same time, demands a higher degree of accuracy in machining the parts and makes the assembling operation hard. On the other hand, the gap C which is larger than 0.05 mm impairs the labyrinth effect of suppressing the scattering around of oil mist.

Further, it is preferred to use materials whose thermal expansion coefficients are the same for making both the polygon mirror 1 and the labyrinth ring 2. For example, if both the polygon mirror 1 and the labyrinth ring 2 are made of a material such as aluminum or an aluminum alloy, both members have the same thermal expansion coefficient. As a result, even if the light deflecting system is used under the condition in which temperature changes drastically, the small gap C can be maintained constant owing to the fact that the polygon mirror 1 and the labyrinth ring 2 have the same thermal expansion coefficient. Therefore, the small gap C can be constructed as small as possible, preventing itself from being affected by temperature change.

On the other hand, a substantially annular yoke 5 made of a magnetic material is secured to the inner circumferential surface of the lower portion of the hub 4 so as to be integral with each other. A drive magnet 6 is fixed to the inner circumferential surface of the yoke 5 by bonding. Further, the central portion of a stator core 7 is fitted with and fixed to an annular stand portion 3a of the frame 3. A plurality of salient poles are formed on the core 7, each salient pole having a coil wound. The outer circumferential surface of each salient pole confronts the drive magnet 6 while interposing a predetermined distance therebetween. When the coil is energized by applying current thereto, the drive magnet 6 is energized to rotate subjected to magnetic action, and the rotation of the drive magnet 6 rotates not only the hub 4 but also the polygon mirror 1 secured to the hub 4.

2nd Embodiment

Figure 2:
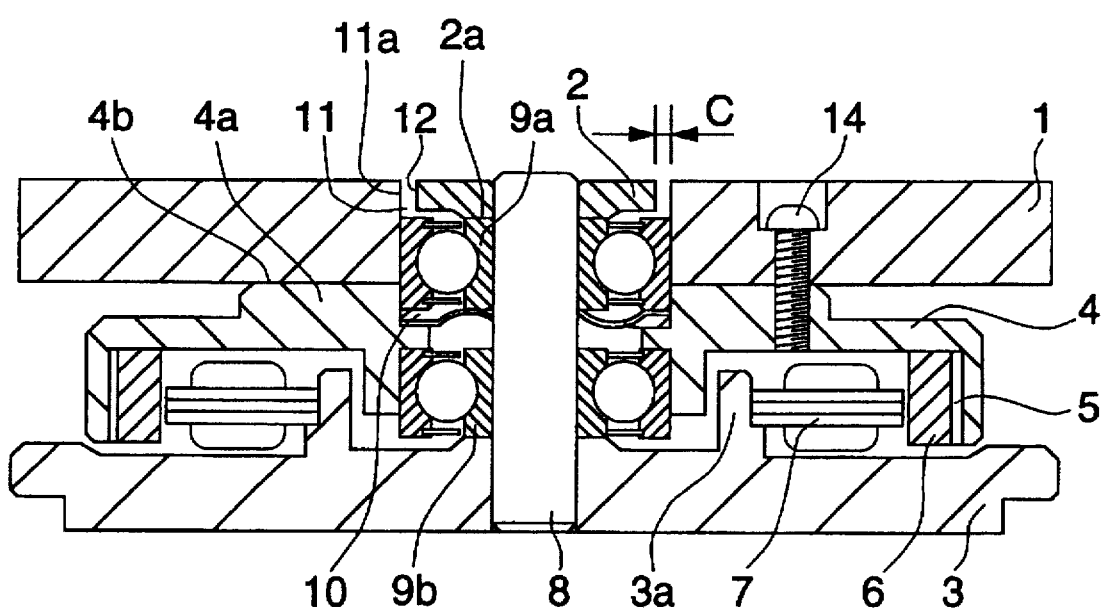
FIG. 2 is a sectional view showing a shaft-fixed rotary polygon mirror type light deflecting system, which is a second embodiment of the invention.

FIG. 2 is a sectional view showing a shaft-fixed rotary polygon mirror type light deflecting system, which is a second embodiment of the invention. A space is provided on the upper portion of the circular hole 11 of the polygon mirror 1 by projecting the upper end of the ball bearing 9a arranged in the central hole of the hub 4 from the hub 4 and fitting the circular hole 11 of the polygon mirror 1 with the projected portion of the outer ring of the ball bearing 9a. Further, the labyrinth ring 2 is secured to the fixed shaft 8 projected from the ball bearing 9a within the space and causing the inner circumferential surface 11a of the circular hole 11 of the polygon mirror 1 to confront the outer circumferential surface of the labyrinth ring 2 with the small gap C interposed therebetween.

3rd Embodiment

Figure 3:
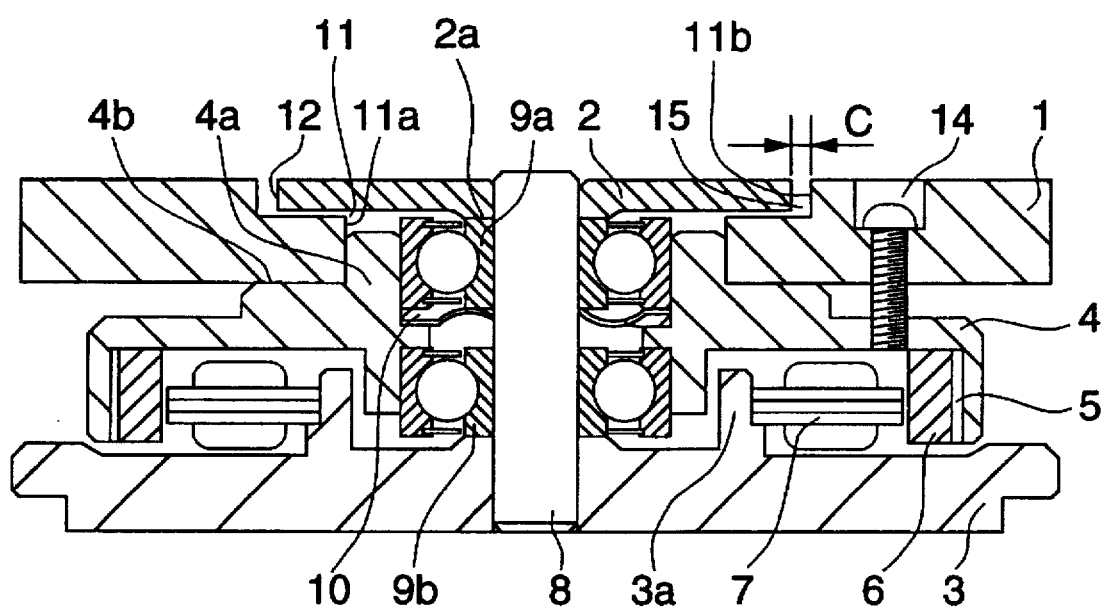
FIG. 3 is a sectional view showing a shaft-fixed rotary polygon mirror type light deflecting system, which is a third embodiment of the invention.
Figure 4:
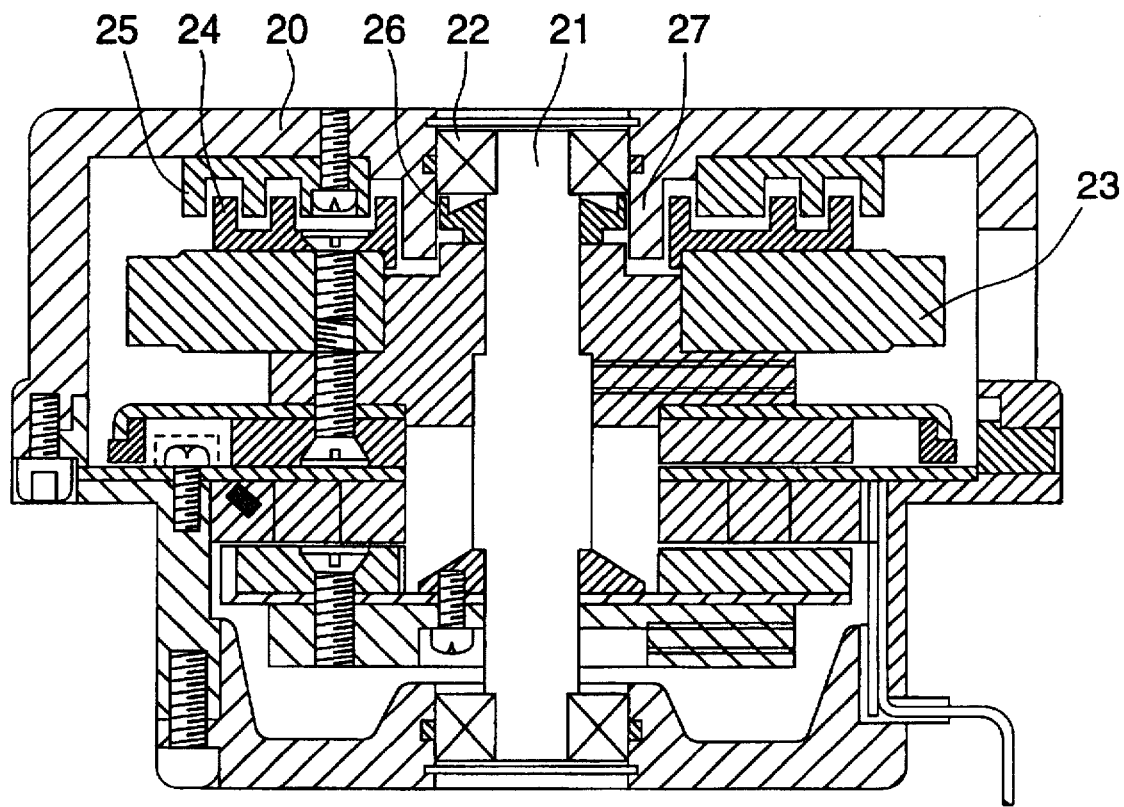
FIG. 4 is a sectional view showing a conventional shaft-fixed rotary polygon mirror type light deflecting system.

FIG. 3 is a sectional view showing a shaft-fixed rotary polygon mirror type light deflecting system, which is a third embodiment of the invention. A two-stepped space is provided by forming a recessed portion 15 on the upper end of the polygon mirror 1, the recessed portion 15 communicating with the circular hole 11. Next, the labyrinth ring 2 that is secured to the fixed shaft 8 is arranged within this space, and causing the inner circumferential surface 11b of the recessed portion 15 to confront the outer circumferential surface of the labyrinth ring 2 with the small gap C interposed therebetween. As a result of this construction, the diameter of the labyrinth formed by the inner circumferential surface 11b of the recessed portion 15 and the labyrinth ring 2 is made large, which in turn increases the relative circumferential speed of the polygon mirror 1 with respect to the labyrinth ring 2, thus further improving the labyrinth effect.

It should be noted that an annular projection 2a is formed on the lower center portion of the labyrinth ring 2 and fixed to the fixed shaft 8 while abutted against the inner ring of the ball bearing 9a with a predetermined pressure given to the inner ring of the ball bearing 9a as shown in FIG. 1 so that this arrangement can serve also as giving a predetermined load to the ball bearings 9a, 9b in advance.

The present invention is characterized as forming the labyrinth by causing the outer circumferential surface of the labyrinth ring fixed to the fixed shaft to confront the inner circumferential surface of the polygon mirror with the small gap interposed therebetween in the radial direction. Therefore, the leaking out of a mist of lubricating oil produced from within the bearings can be suppressed by the labyrinth, thereby preventing contamination of the reflecting surfaces of the polygon mirror. In addition, the labyrinth is formed within the space formed between the inner circumferential surface of the polygon mirror and the fixed shaft. Therefore, a downsized and thin-sized light deflecting system can be implemented. Moreover, the labyrinth is formed by the labyrinth ring and the polygon mirror 1 itself. Therefore, the number of parts is reduced, thereby contributing to simplifying the assembling operation as well as reducing the cost of manufacture.

Further, the invention is also characterized as fixing the lower portion of the circular hole of the polygon mirror to the hub while fitted with the sleeve arranged in the center of the hub, the lower portion being as viewed in the axial direction of the polygon mirror. Therefore, the inner circumferential surface of the polygon mirror can be set so as to be concentric with the fixed shaft, thus allowing the outer circumferential surface of the labyrinth ring and the inner circumferential surface of the polygon mirror, both forming the labyrinth, to be reliably assembled so as to be concentric with the fixed shaft in the radial direction.

Still further, if the thermal expansion coefficient of the polygon mirror and that of the labyrinth ring are made equal to each other, the small gap forming the labyrinth can be maintained constant even though ambient temperature changes. Therefore, a light deflecting system that is highly reliable with respect to temperature change can be implemented.

What is claimed is:

1. A polygon mirror driving apparatus for a rotary polygon mirror type light deflecting system comprising:

a shaft;

ball bearings fitted to said shaft;

a hub rotatably supported by said ball bearings, said hub having a drive magnet;

a core including salient poles, said each salient pole having a coil wound and confronting said drive magnet;

a polygon mirror fixed to said hub so as to rotate integrally with said hub, said polygon mirror having a circular hole, in the center thereof said circular hole forming an inner circumferential surface of said polygon mirror and means for foxing a labyrinth within a space between the inner circumferential surface of said polygon mirror and said shaft.

2. A polygon mirror driving apparatus according to claim 1, wherein said forming means includes a labyrinth ring fixed to the end of said shaft, an outer circumferential surface of said labyrinth ring confronting the inner circumferential surface of said polygon mirror so as to interpose a small gap therebetween in the radial direction of said labirinth ring and said polygon mirror.

3. A polygon mirror driving apparatus according to claim 2, wherein a lower portion of the circular hole is fixed to a central portion of said hub, the lower portion being as viewed in the axial direction of said shaft, said labyrinth ring is arranged within a space formed in an upper portion of the circular hole so as to form the labyrinth within the space.

4. A polygon mirror driving apparatus according to claim 2, wherein a lower portion of the circular hole is fixed to a projected portion of an outer ring of said ball bearings projecting from the upper end of said hub, the lower portion being as viewed in the axial direction of said shaft, said labyrinth ring is arranged within a space formed in an upper portion of the circular hole so as to form the labyrinth within the space.

5. A polygon mirror driving apparatus according to claim 3, wherein a two-stepped space is provided by forming a recessed portion communicating with the circular hole on the upper end of said polygon mirror and said labyrinth ring is arranged within the recessed portion and the space formed in the upper portion of the circular hole, so that the small gap is interposed between the outer circumferential surface of said labyrinth ring and an inner circumferential surface of the recessed portion.

6. A polygon mirror driving apparatus according to claim 2, wherein the gap is set to 0.01 to 0.05 mm.

7. A polygon mirror driving apparatus according to claim 2, wherein both said polygon mirror and said labyrinth ring are made of materials whose thermal expansion coefficients are equal to each other.

8. A polygon mirror driving apparatus according to claim 7, wherein both said polygon mirror and said labyrinth ring are made of one of aluminum and aluminum alloy.

* * * * *